(12) United States Patent
Neumann et al.

(10) Patent No.: US 9,253,171 B2
(45) Date of Patent: Feb. 2, 2016

(54) DISTRIBUTED NETWORK ENCRYPTION KEY GENERATION

(71) Applicant: Raytheon Company, Waltham, MA (US)

(72) Inventors: Matthew D. Neumann, Dallas, TX (US); Michael W. Smith, Murphy, TX (US)

(73) Assignee: Raytheon Cyber Products, LLC, Herndon, VA (US)

( * ) Notice: Subject to any disclaimer, the term of this patent is extended or adjusted under 35 U.S.C. 154(b) by 275 days.

(21) Appl. No.: 13/922,382

(22) Filed: Jun. 20, 2013

(65) Prior Publication Data

US 2014/0380036 A1 Dec. 25, 2014

(51) Int. Cl.
*H04L 29/06* (2006.01)
*H04L 9/08* (2006.01)

(52) U.S. Cl.
CPC ............ *H04L 63/062* (2013.01); *H04L 9/0819* (2013.01); *H04L 9/0869* (2013.01)

(58) Field of Classification Search
CPC .... H04L 63/062; H04L 9/0869; H04L 9/0819
USPC ........................................................ 713/150
See application file for complete search history.

(56) References Cited

U.S. PATENT DOCUMENTS

| 8,352,725 B1* | 1/2013 | O'Toole, Jr. .................. 713/151 |
| 2002/0062451 A1 | 5/2002 | Scheidt et al. |
| 2005/0010774 A1 | 1/2005 | Rose et al. |
| 2005/0044425 A1* | 2/2005 | Hypponen ..................... 713/202 |
| 2011/0261961 A1* | 10/2011 | Dharmaraju et al. ......... 380/277 |
| 2011/0274112 A1* | 11/2011 | Czaszar et al. ................ 370/392 |
| 2013/0203384 A1* | 8/2013 | Narasimhan et al. ......... 455/411 |
| 2013/0212296 A1* | 8/2013 | Goel et al. .................... 709/238 |
| 2013/0254544 A1* | 9/2013 | Hjelm et al. .................. 713/171 |

FOREIGN PATENT DOCUMENTS

| EP | 0869635 A2 | 10/1998 |
| WO | WO-2012/076041 A1 | 6/2012 |
| WO | WO-2014/205333 A2 | 12/2014 |
| WO | WO-2014205333 A3 | 12/2014 |

OTHER PUBLICATIONS

Rafaeli et al, A Survey of Key Management for Secure Group Communication, Sep. 2003, ACM, vol. 35, No. 3, pp. 309-327.*
Anand et al, Trusted Computing Architectures for Mobile Infrastructure, Nov. 17, 2011, ACM, pp. 73-77.*

(Continued)

*Primary Examiner* — Christopher Brown
*Assistant Examiner* — Jenise Jackson
(74) *Attorney, Agent, or Firm* — Schwegman Lundberg & Woessner, P.A.

(57) ABSTRACT

Embodiments of methods and network devices for securing data within a network are generally described herein. One such method includes a key aggregation server receiving a request for an encryption key to secure the data. The server may query a plurality of network devices for a respective key from each queried network device. The server may then receive the respective key from each of the plurality of network devices and select a key element from each of the plurality of keys. An encryption key may be constructed from the key elements and transmitted to a client.

16 Claims, 6 Drawing Sheets

(56) References Cited

OTHER PUBLICATIONS

"Binomial coefficient", [online]. [archived on Apr. 25, 2013]. Retrieved from the Internet: <URL: https://web.archive.org/web/20130425171217/http://en.wikipedia.org/wiki/Binomial_coefficient>, (modified on Apr. 3, 2013), 22 pgs.

"International Application Serial No. PCT/US2014/043380, Written Opinion mailed Jan. 27, 2015", 5 pgs.

"International Application Serial No. PCT/US2014/043380, Written Opinion mailed Jan. 27, 2015", 8 pgs.

* cited by examiner

DISTRIBUTED NETWORK ENCRYPTION KEY GENERATION

TECHNICAL FIELD

Embodiments relate to file encryption and decryption. Some embodiments relate to encryption key generation.

BACKGROUND

Corporations and government entities seek to substantially reduce unauthorized access to various types of sensitive information. Some systems may reduce or prevent unauthorized access by having users log on to file storage systems with credentials such as user names and passwords. These systems, however, may not prevent authorized users from copying sensitive information and thereby removing sensitive information to one computer or computing system.

Other systems may bind sensitive information to one computer or computing system. However, these systems may be overly restrictive in limiting movement of data. For example, an authorized user may only be able to use the sensitive information at a certain computer.

Thus, there are general needs for system and methods for flexibly securing sensitive files.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As used herein, a network may be any connection between two or more computing devices (physical or virtual). The network might be a local area network or a wide area network. The Internet is only one example of a wide area network.

As used herein, a network device may be defined as any computing device (physical or virtual) that is coupled to a network and capable of storing and transmitting distributed keys when requested. As examples of physical computing devices, a network device can include routers, switches, modems, computers, and servers. As an example of a virtual computing device, a virtual host that is coupled to a network and executing an agent can be considered a network device.

Encryption keys used to encrypt and decrypt sensitive data may be distributed across the network by storing each key in one or more network devices. One of the network devices, a key aggregation server, may then coordinate key generation and collection across the network devices for later encryption and decryption of sensitive data.

Each network device has the ability to store and transmit a key. As only one example, distributed keys may be stored in one or more associated loopback addresses that are used by a particular network device for testing transportation infrastructure of the element. Distributed keys may be stored in description fields that may be associated with the loopback addresses. Since each network device may host a range of loopback addresses, each device may store one or more different keys.

A loopback address range commonly used in the industry may include 127.0.0.1/8 for Internet Protocol version 4 (IPv4) where each element of the 32-bit address may be a decimal, hexadecimal, octal or other number base digit. Other IP address versions (e.g., IPv6) or other IP addresses might be used for the loopback address. Additionally, other IP addresses might be mapped to the loopback address.

It should be noted that using the description field of the loopback address is for purposes of illustration only. Distributed keys may be stored in other key storage addresses of each network device. As will be discussed subsequently, each key may also be stored in more than one network device for redundancy.

Figure 1:
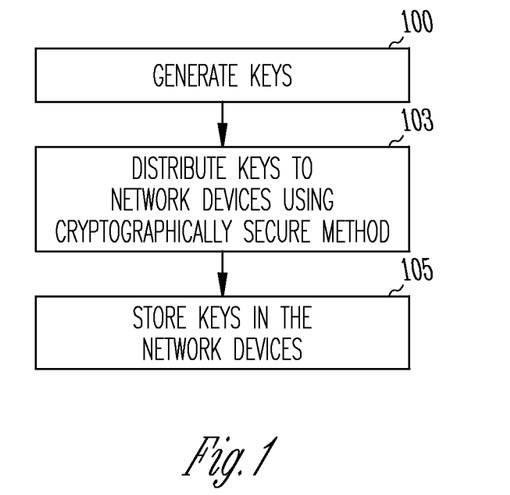
FIG. 1 shows a flowchart of an embodiment of a method for generation and distribution of keys to network devices.

FIG. 1 illustrates a flowchart of an embodiment for generation and distribution of encryption keys to network devices. The keys may be generated 100 using a high entropy key generation method. One such key generation method might include the Open Secure Socket Layer Rivest-Shamir-Adleman (OpenSSL RSA) key generation method. Other embodiments might use other key generation methods.

The keys may be randomly distributed to the devices, a hash function may be used to distribute the keys, or some other cryptographically secure method might be used 103.

If the keys are randomly distributed, at least one element of the network (e.g., key aggregation server) should keep track of where each key is distributed in order to be able to perform a decryption later. Similarly, if a hash function is used to distribute the keys, at least one element of the network (e.g., key aggregation server) should keep track of the network devices to which the keys are mapped for later retrieval.

As an example of using a hash function to distribute the keys, the key aggregation server might use the hash function to compute an index into an array of addresses and build a lookup table of actual addresses to which the keys might be distributed. Using the hash function to assign the keys may prevent clients on the network from subverting the key aggregation service and retrieving and rebuilding keys on their own. For each key storage address in the network, the lookup table might have the location of the storage address (e.g., the network device Media Access Control (MAC) address), the hashed location of the network device, and the hash value assigned to that location. These values can be used later in rebuilding the key.

Figure 2:
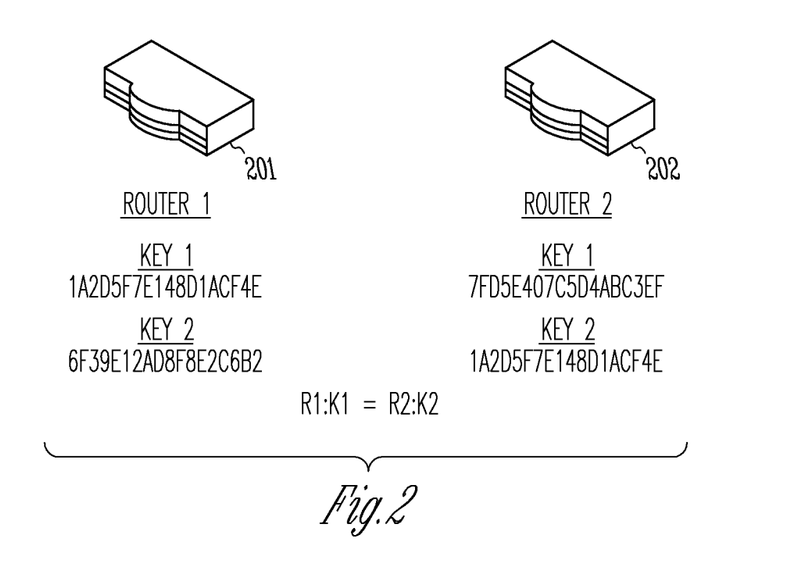
FIG. 2 shows a block diagram of an embodiment of redundant key representation in various network devices.

In an embodiment, the hash function might assign the same key to different locations in different network elements as illustrated in FIG. 2. This may provide redundancy if a network device becomes inoperative. The keys in that particular device may still be located in other network devices.

The distributed keys may then be stored in the network devices 105. As discussed previously, the keys might be stored in the description field of the one or more key storage addresses for each device.

The keys and their locations in the network may also be stored on an offline storage device as a backup option. Thus, if one or more of the network devices are disabled, a manual decryption option is still available to a network administrator so that encrypted data may not be lost.

FIG. 2 illustrates a block diagram of an embodiment of redundant key representation in various network devices. This block diagram illustrates two network devices 201, 202 that may store distributed keys. The illustrated devices are routers 201, 202. Other embodiments, however, may use network switches, computers, and/or other network devices to store the distributed keys.

FIG. 2 shows that router 1 201 has two stored keys Key 1 and Key 2. Router 2 202 also has two stored keys Key 1 and Key 2. For redundancy purposes, router 1 201, Key 1 is the same distributed key as router 2 202, Key 2. Thus, if the connection of either of the routers 201, 202 to the network is disrupted by an inoperative router 201, 202 or some other disruption, the redundant key may still be available on the network.

FIG. 2 shows only two keys stored in each router. Other embodiments may store a different quantity of keys.

Figure 3:
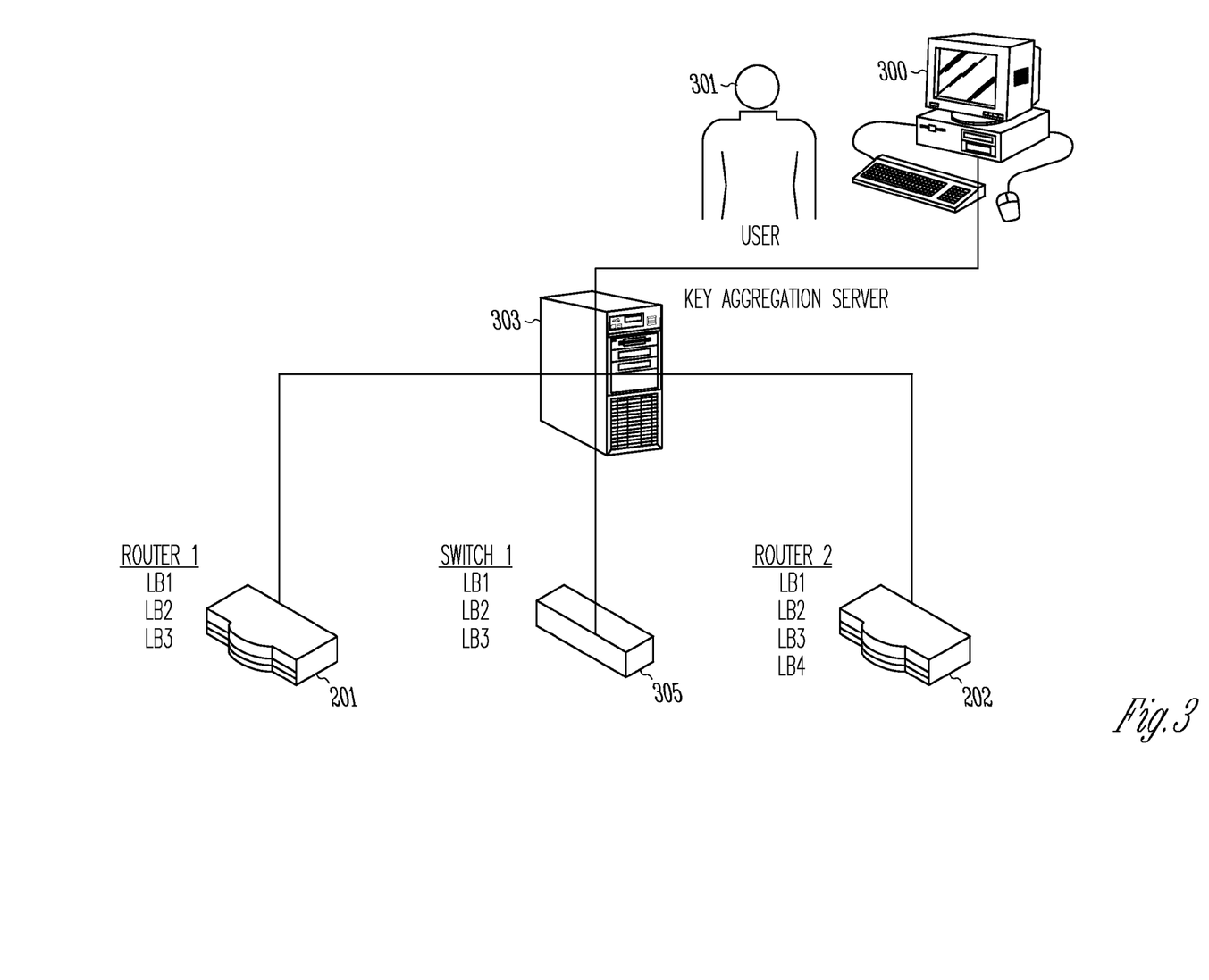
FIG. 3 shows an embodiment of a network diagram.

FIG. 3 shows an embodiment of a network diagram. The illustrated network may incorporate the routers 201, 202 as illustrated in FIG. 2 in addition to the other network devices. Each of the subsequently described network devices may be physical or virtual.

A computing device 300 may comprise client software that uses the network distributed keys for encryption/decryption methods to secure data as initiated by a user 301. In other words, a client might use a key to encrypt a file that has been generated by the client or the client might use the key to decrypt and open a file that has been generated by the client, or other processes, and subsequently encrypted.

While a typical personal computer 300 is shown, the computing device 300 may encompass other devices such as tablet computers and smart phones. The computing device 300 may be coupled to the network via wired connection or wireless radio base stations.

A server 303 may be coupled to the computing device 300 through either a wired or wireless connection. The server may be the key aggregation server as described previously. This server 303 may be responsible for receiving key requests, building a lookup table, distributing the keys to the network devices 201, 202, 305, looking up locations from received hashes, aggregating key responses from network devices, and sending the responses back to a client being executed by the computing device 300. In other embodiments, the server 303 may also be responsible for other functions.

Router 1 201 is shown with three key storage addresses LB1-LB3. Router 2 202 is shown with four key storage addresses LB1-LB4. Switch 1 305 is shown with three key storage addresses LB4-LB6. These key storage addresses may each have associated fields (e.g., description fields) that may be used by the aggregation server 303 to store the distributed keys.

The network of FIG. 3 may include other network devices that are not illustrated. For example, the network may include additional switches, routers, and/or servers. Each of the additional network devices may have the capability to store distributed keys.

Figure 4:
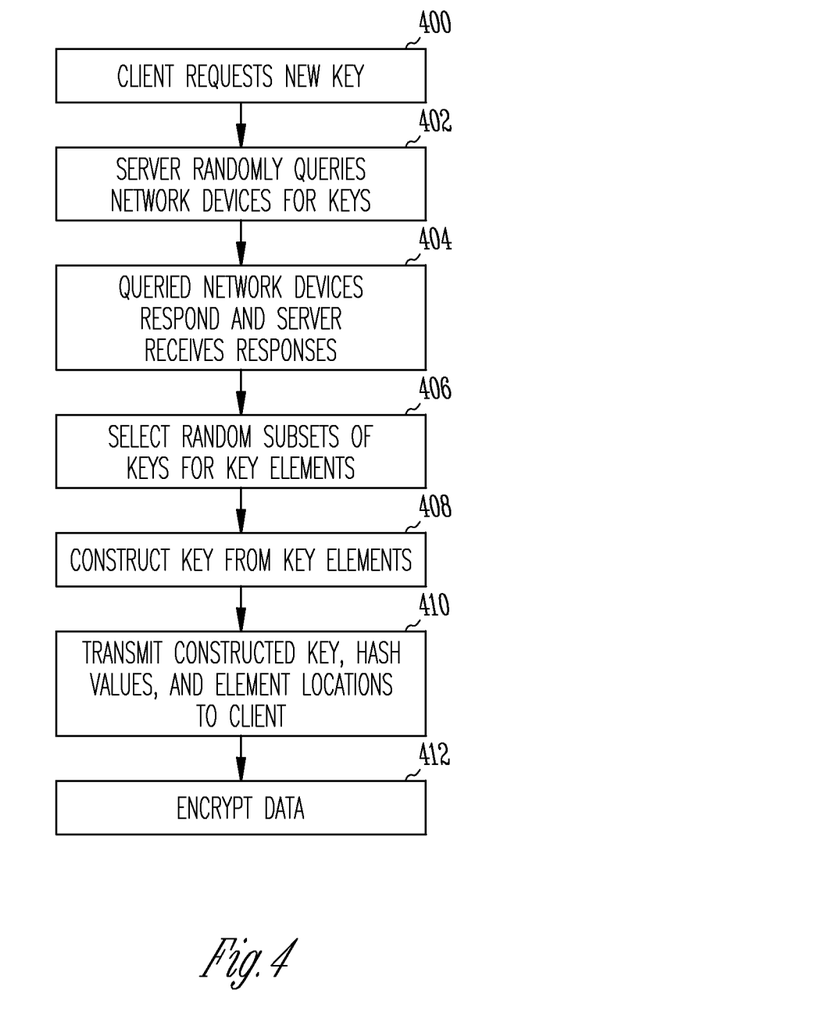
FIG. 4 shows a flowchart of an embodiment of a method for distributed key encryption of data in a network.

FIG. 4 illustrates a flowchart of an embodiment of a method for distributed key encryption to secure data in a network. In describing the operation of an encryption method with a network having distributed keys, reference will be made to both FIGS. 3 and 4.

In 400, when a user 301 desires to encrypt data on a computing device 300, the user may instruct a client on the computing device 300 to request a new key from the network. This request may be transmitted by the client to the key aggregation server 303.

The key aggregation server 303 may comprise a lookup table that stores, for each key storage address: locations, hash locations, and a hash value for each location of each of the network devices 201, 202, 305. The hash values of the locations may not be useful for encrypting data but may be useful during a decryption method, as described subsequently.

In 402, the key aggregation server 303 may then randomly query network devices 201, 202, 305 for keys and their respective hash values. The key aggregation server 303 may randomly query a subset of the network devices 201, 202, 305 depending on the quantity of network devices that are currently storing keys and the desired size of the resulting key to be built.

In 404, the queried network devices 201, 202, 305 each respond to their respective query with the requested key and the key's associated hash value. The key aggregation server 303 receives these responses from the network devices 201, 202, 305. If not all of the network devices 201, 202, 305 are queried, only the subset of the network devices 201, 202, 305 may respond back to the server 303.

In 406, the key aggregation server 303 chooses a random subset of received keys to be used as key elements. For example, the key aggregation server 303 might randomly choose two digits (e.g., eight bits) from each received key to be used as the key elements. This concept is illustrated in FIG. 5.

Figure 5:
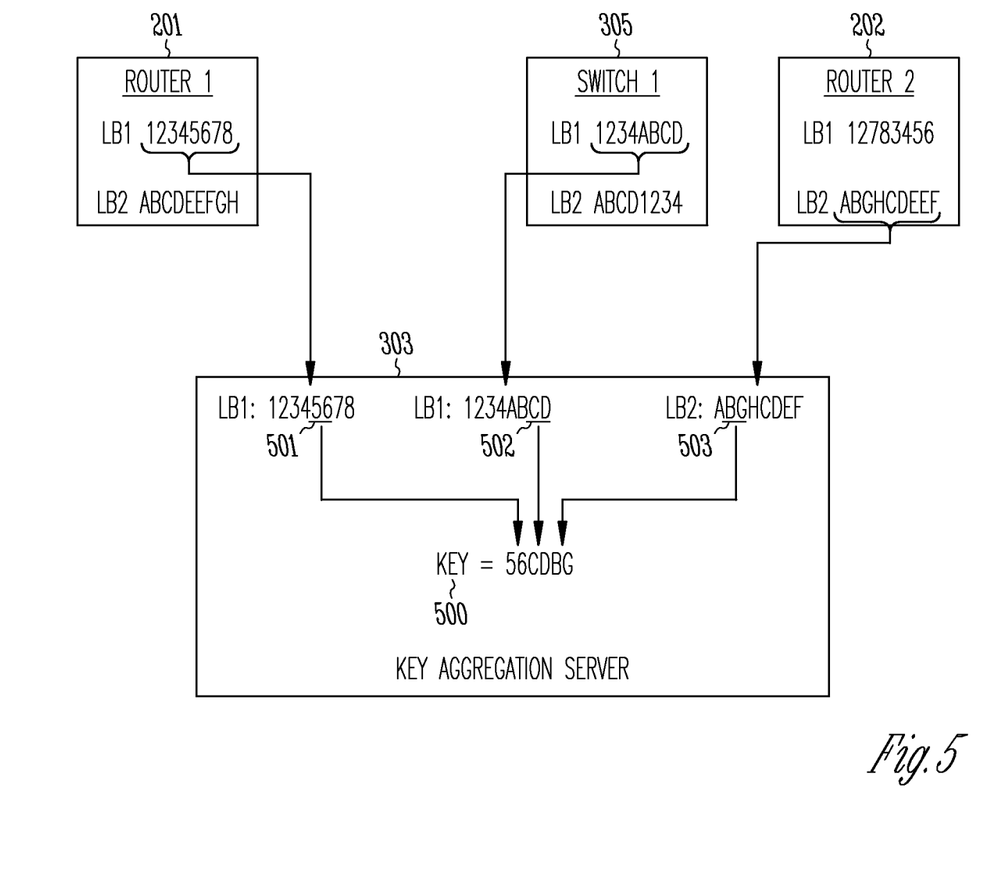
FIG. 5 shows a diagram of an embodiment of key retrieval and aggregation.

FIG. 5 illustrates a diagram of an embodiment of key retrieval and aggregation. The three network devices 201, 202, 305 from FIG. 3 are shown with their respective key storage addresses LB1, LB2 and the associated key stored with each respective key storage address. For example, router 1 201 includes its respective key storage address LB1 with associated key "12345678" and respective key storage address LB2 with associated key "ABCDEFGH". Router 2 202 includes its respective key storage address LB1 with associated key "12782356" and respective key storage address LB2 with associated key "ABGHCDEF". Similarly, switch 1 305 includes respective key storage address LB1 with associated key "1234ABCD" and respective key storage address LB2 with associated key "ABCD1234".

FIG. 5 illustrates that the key aggregation server 303 has received the key responses from the network devices 201, 202, 305 along with their respective key storage addresses. For example, router 1 201 has responded with LB1: 12345678, router 2 202 has responded with LB2:ABGHCDEF, and switch 1 305 has responded with LB1:1234ABCD.

The key aggregation server 303 may randomly take a key element 501-503 from each of these keys and use the key elements 501-503 to build an encryption key 500. The key elements 501-503 may be subsets of the stored keys. For example, the key element "56" 501 from the router 1 201, the key element "BG" 503 from the router 2 202, and the key element "CD" 502 from the switch 1 305 are combined into a single key 500 in the key aggregation server.

The keys used in FIG. 5 are for purposes of illustration only. The present embodiments are not limited to any one size of key or the composition of the keys. For example, a key may be any combination of alphanumeric characters, numeric characters, alphabet characters or symbols.

Referring again to FIGS. 3 and 4, in 408, the key is constructed from the key elements. In 410, the constructed key 500 may be transmitted to the client in the computing device 300. In addition to the constructed key 500, the hash values of those keys that point to the actual locations (e.g., R1:LB1, R2:LB2, S1:LB1) and the location of the key elements within each of those keys might also be transmitted to the client. In 412, the constructed key may be used to encrypt the data. The actual locations of the keys are not transmitted in order to prevent a client from bypassing the decryption process.

The embodiments of FIGS. 3-5 show eight digit (i.e., 32-bit) keys and two digit (i.e., 8-bit) key elements used to construct a 24-bit key. Other embodiments might use other sizes for both the key elements and the constructed key, depending on the desired security and the number of network devices that have distributed keys. For example, a 256-bit key might be built from 32 key elements if the key elements are 8-bit elements. As is known in the art, larger keys may provide greater security than smaller keys.

Figure 6:
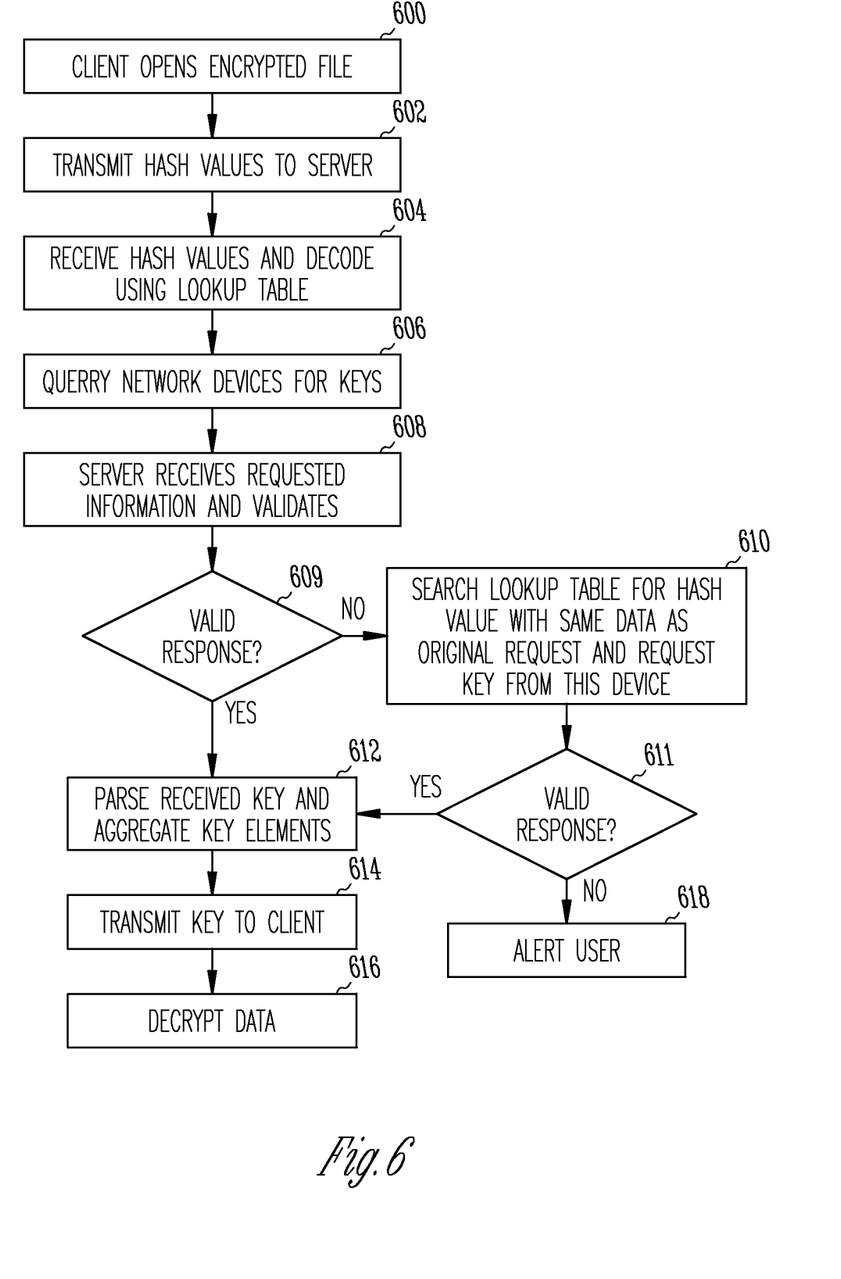
FIG. 6 shows a flowchart of an embodiment of a method for distributed key decryption of data in a network.

FIG. 6 illustrates a flowchart of an embodiment of a method for distributed key decryption of data in the network. Referring to both FIGS. 3 and 6, in 600, the user 301 may open a file that is encrypted with a distributed network key. In 602, this may result in a request being transmitted to the key aggregation server 303 for the key elements that correspond to the encrypted data. The request may comprise the hash values being transmitted to the key aggregation server 303.

In 604, the key aggregation server 303 may receive the requests from the client and decode the hash values using the lookup table. As discussed previously, the lookup table may include the actual key element locations associated with the hash values as well as the hashed locations. The actual locations may include the network device address (e.g., MAC address) and the respective key storage address within that network device that includes the desired key element.

In 606, the key aggregation server 303 may query the network devices as determined by the lookup table. A query may include a request for the key stored in the key storage address for each queried network device.

In 608, the key aggregation server 303 may receive the requested keys from the queried network devices and validate the responses to make sure that a key received from a network device's key storage address has not been changed. The key aggregation server 303 may validate the response from each key storage address by comparing a hash value stored in its lookup table for that particular key storage address. In 609, if the response is not valid, the key aggregation server 303 may then, in 610, perform a search of the lookup table for a hash value with the same key storage address as the original request and request the key from the associated network device.

At 611, a validation process is again performed on the received key. If this validation also fails, an error message may be transmitted to the client in 618. The error message may include an indication that the decryption has failed. In such an event, a network administrator may be able to decrypt the file manually from the offline backup or restore the failed keys at their respective key storage addresses with the correct key.

In 612, if either validation has passed, the key aggregation server may parse the received keys for the specific key elements requested and aggregate these key elements to form the full, rebuilt key. In 614, this rebuilt key is transmitted back to the client. For example, the key might be transmitted to the client through a secure shell (SSH) tunnel. The rebuilt key may then be used to decrypt the data in 616.

Figure 7:
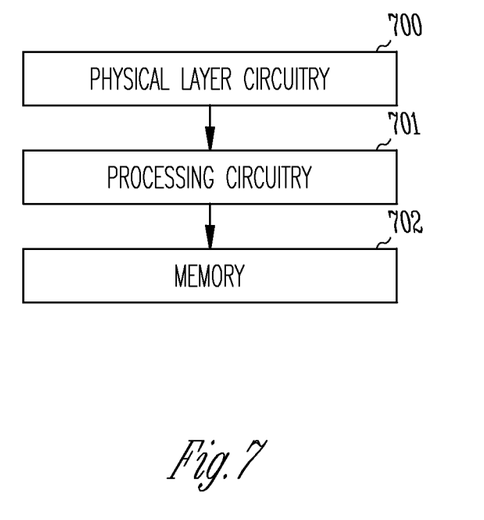
FIG. 7 shows a block diagram of an embodiment of a network device.

FIG. 7 illustrates a block diagram of an embodiment of a network device. In one embodiment, the network device might be the key aggregation server.

The network device may include physical layer circuitry 700 to communicate over the network with other network devices. The network device may also include processing circuitry 701 coupled to the physical layer circuitry 700 to perform other operations described herein.

In accordance with embodiments, the physical layer circuitry 700 may be configured to transmit and receive keys and generated encryption keys. The physical layer circuitry 700 may also be configured to transmit and receive hash values and queries for keys and hash values.

In accordance with embodiments, the processing circuitry 701 may be configured to store data (keys, lookup tables, hash values) in the memory 702 of the network device. The processing circuitry 701 may also be configured to control operation of the key aggregation server and execute embodiments of the distributed network encryption key generation. For example, the controller 701 might be configured to control distribution of the keys to other network devices and generate encryption/decryption keys as requested.

Memory 702 may be coupled to the controller 701. The memory 702 may be configured to store the lookup tables used by the embodiments of the distributed network encryption key generation. The memory 702 may also be configured to store key responses from other network elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for securing data in a network comprising a plurality of network devices, the method comprising:
   receiving a request for an encryption key to secure the data;
   querying the plurality of network devices for a plurality of keys, each network device storing a respective key;
   receiving the respective key in a field associated with a loopback address from each of the plurality of network devices, wherein an associated hash value is received with each respective key, the hash value comprising a pointer to a location of its associated key within the respective network device;
   selecting a key element from each of the plurality of keys, wherein the key element comprises a subset of each respective key that is less than the respective key and selecting the key element from each of the plurality of keys comprises selecting random subsets of each of the plurality of keys;
   constructing the encryption key from the key elements; and
   transmitting the encryption key to a client.

2. The method of claim 1 wherein the field associated with the loopback address comprises a description field.

3. The method of claim 1 wherein transmitting the encryption key to the client comprises transmitting the hash value associated with each key and a location each selected key element within each respective key.

4. The method of claim 1 and further comprising building a lookup table comprising the received keys and their associated hash values.

5. The method of claim 1 wherein querying the plurality of network devices for a plurality of keys comprises querying a quantity of network devices in response to a desired size of the encryption key.

6. The method of claim 5 wherein querying the quantity of network devices in response to the desired size of the encryption key comprises querying random ones of the plurality of network devices.

7. A method for securing data in a network comprising a plurality of network devices including a key aggregation server, each network device comprising a plurality of key storage addresses, the method comprising:
   receiving at the key aggregation server, from a client coupled to the network, a request for an encryption key to secure the data within the network;
   randomly querying a subset of the plurality of network devices for a respective key from an associated key storage address from each network device of the subset of the plurality of network devices;
   receiving from the queried network devices the respective keys in a field associated with a loopback address and associated hash values of the key storage addresses of each respective key, wherein the associated hash values include a pointer to a location of its associated key within the respective queried network devices;
   randomly selecting a key element from each of the respective keys, wherein the key element comprises a subset of each respective key that is less than the respective key;
   constructing the encryption key from the key elements; and
   transmitting to a client, the encryption key, the hash values, and locations of the key elements of each respective key.

8. The method of claim 7 and further comprising generating a decryption key by:
   receiving the hash values from the client;
   decoding the hash values with a lookup table comprising the hash values and their associated key element locations in the network,
   querying the plurality of network devices in response to the decoding;
   receiving respective keys from queried network devices;
   parsing the received keys for key elements in response to the decoding;
   aggregating the key elements into the decryption key; and
   transmitting the decryption key to the client.

9. The method of claim 8 wherein querying the plurality of network devices comprises requesting a key stored in a description field of a key storage address of respective queried network device.

10. A network device configured to generate an encryption key for securing data within a network, the network device comprising:
    memory configured to store a hash value lookup table, keys, and hash values; and
    processing circuitry coupled to the memory and configured to query each of a plurality of network devices, through physical layer circuitry, for a respective key stored in each queried network device, receive the respective key, from each of the queried network devices, in a field associated with a loopback address, randomly select a subset from each of the plurality of keys, wherein the subset is less than the respective key, generate the encryption key from the selected subsets, and control transmission of the encryption key, through the physical layer circuitry, to a requesting client, wherein an associated hash value is received with each respective key, the hash value comprising a point to a location of its associated key within each respective queried network devices.

11. The network device of claim 10 wherein the processing circuitry is further configured to store the hash value lookup table in the memory, distribute keys to the plurality of network devices through the physical layer circuitry, aggregate key responses from queried network devices, and send the encryption key to a requesting client through the physical layer circuitry.

12. The network device of claim 10 wherein the network device is a key aggregation server.

13. The network device of claim 10 wherein the processing circuitry is further configured to generate keys and control distribution of the keys to a plurality of key storage addresses of each of the plurality of network devices.

14. The network device of claim 10 wherein the plurality of network devices comprise one or more of routers or switches.

15. The network device of claim 10 wherein the processing circuitry and physical layer circuitry are further configured to receive a request for a decryption key, receive hash values associated with the encryption key, decode the hash values in response to the lookup table in memory, query the plurality of network devices for keys, parse received keys for subsets of the keys, aggregate the subsets into the decryption key, and transmit the decryption key to a requesting client.

16. The network device of claim 15 wherein the processing circuitry is further configured to validate the received hash values by comparing the received hash value to hash values stored in the lookup table, determine an associated key storage address for an associated network device for the received hash value, and request the respective key from the associated network device.

* * * * *

UNITED STATES PATENT AND TRADEMARK OFFICE
CERTIFICATE OF CORRECTION

| | |
|---|---|
| PATENT NO. | : 9,253,171 B2 |
| APPLICATION NO. | : 13/922382 |
| DATED | : February 2, 2016 |
| INVENTOR(S) | : Neumann et al. |

It is certified that error appears in the above-identified patent and that said Letters Patent is hereby corrected as shown below:

In column 6, line 14, after "controller", delete "701", therefor

In column 6, line 17, delete "701." and insert --.--, therefor

Signed and Sealed this
Sixteenth Day of August, 2016

Michelle K. Lee
*Director of the United States Patent and Trademark Office*